(12) United States Patent
Tsuji et al.

(10) Patent No.: US 9,158,184 B2
(45) Date of Patent: Oct. 13, 2015

(54) PROJECTOR DEVICE, DISTORTION CORRECTION METHOD, AND RECORDING MEDIUM STORING DISTORTION CORRECTION PROGRAM

(71) Applicants: Shigekazu Tsuji, Tokyo (JP); Naoto Takahashi, Kanagawa (JP)

(72) Inventors: Shigekazu Tsuji, Tokyo (JP); Naoto Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 335 days.

(21) Appl. No.: 13/647,487

(22) Filed: Oct. 9, 2012

(65) Prior Publication Data

US 2013/0107227 A1    May 2, 2013

(30) Foreign Application Priority Data

Nov. 2, 2011    (JP) ................................. 2011-241175

(51) Int. Cl.
*H04N 9/31* (2006.01)
*G03B 21/14* (2006.01)

(52) U.S. Cl.
CPC ............ *G03B 21/145* (2013.01); *G03B 21/147* (2013.01); *H04N 9/3185* (2013.01); *H04N 9/3194* (2013.01)

(58) Field of Classification Search
CPC ........................... H04N 9/3185; H04N 9/3194
USPC ...................................................... 353/69, 70
See application file for complete search history.

(56) References Cited

U.S. PATENT DOCUMENTS

| | | | |
|---|---|---|---|
| 6,036,320 A | 3/2000 | Inaba | |
| 6,367,933 B1 * | 4/2002 | Chen et al. | 353/69 |
| 6,686,973 B2 * | 2/2004 | Su | 348/745 |
| 7,204,596 B2 * | 4/2007 | Tamura | 353/70 |
| 7,661,825 B2 * | 2/2010 | Nishida | 353/69 |
| 8,282,219 B2 * | 10/2012 | Tanaka | 353/70 |
| 8,297,757 B2 * | 10/2012 | Kubota | 353/70 |

(Continued)

FOREIGN PATENT DOCUMENTS

| | | |
|---|---|---|
| CN | 1227353 A | 9/1999 |
| CN | 101154020 A | 4/2008 |

(Continued)

OTHER PUBLICATIONS

Chinese Office Action mailed Aug. 19, 2014.

(Continued)

*Primary Examiner* — Bao-Luan Le
(74) *Attorney, Agent, or Firm* — Harness, Dickey & Pierce, P.L.C.

(57) ABSTRACT

A device, method, and program stored in a recording medium are provided. A sampling time period and, a value of limit angle are set. Inclination of the projector device is detected with respect to a horizontal surface to output a plurality of inclination angle values of the projector device. A representative angle value of a current sampling time period is calculated based on the plurality of inclination angle values and the difference between the representative angle value and a representative angle value from a previous sampling time period is calculated. It is determined whether the difference in representative angle value is equal to or greater than the limit angle value to generate a determination result. Finally, trapezoidal distortion in the image is corrected based on the inclination angle values detected when the determination result indicates that the difference is equal to or greater than the limit angle value.

11 Claims, 5 Drawing Sheets

(56) References Cited

U.S. PATENT DOCUMENTS

| | | | |
|---|---|---|---|
| 8,322,863 B1* | 12/2012 | Cho et al. | 353/70 |
| 8,425,051 B2* | 4/2013 | Ozawa | 353/70 |
| 8,836,869 B2* | 9/2014 | Suzuki | 348/744 |
| 2003/0223048 A1* | 12/2003 | Kimura | 353/70 |
| 2004/0041985 A1* | 3/2004 | Kimura et al. | 353/70 |
| 2005/0012907 A1* | 1/2005 | Inoue | 353/70 |
| 2005/0030487 A1* | 2/2005 | Inoue | 353/69 |
| 2005/0046804 A1* | 3/2005 | Akutsu | 353/70 |
| 2005/0052620 A1* | 3/2005 | Tamura | 353/69 |
| 2005/0073661 A1* | 4/2005 | Tamura | 353/70 |
| 2005/0078282 A1* | 4/2005 | Tamura | 353/70 |
| 2006/0290896 A1* | 12/2006 | Nishida | 353/69 |
| 2008/0079854 A1 | 4/2008 | Ehara et al. | |
| 2010/0103385 A1* | 4/2010 | Kubota | 353/70 |
| 2010/0103386 A1* | 4/2010 | Kubota | 353/70 |
| 2010/0165302 A1* | 7/2010 | Ozawa | 353/70 |

FOREIGN PATENT DOCUMENTS

| | | |
|---|---|---|
| JP | 2003-029714 | 1/2003 |
| JP | 2004-029110 | 1/2004 |
| JP | 2005-031205 A | 2/2005 |
| JP | 2005030917 A | 2/2005 |
| JP | 2005-079939 | 3/2005 |
| JP | 2005-143054 | 6/2005 |
| JP | 2006157329 A | 6/2006 |
| JP | 2007-214752 | 8/2007 |
| JP | 2008-241490 | 10/2008 |

OTHER PUBLICATIONS

Japanese Office Action dated Jun. 23, 2015 for corresponding JP Application No. 2011-241175.

* cited by examiner

PROJECTOR DEVICE, DISTORTION CORRECTION METHOD, AND RECORDING MEDIUM STORING DISTORTION CORRECTION PROGRAM

CROSS-REFERENCE TO RELATED APPLICATIONS

This patent application is based on and claims priority pursuant to 35 U.S.C. §119 to Japanese Patent Application No. 2011-241175, filed on Nov. 2, 2011, in the Japan Patent Office, the entire disclosure of which is hereby incorporated herein by reference.

BACKGROUND

1. Field

The present invention generally relates to a projector device capable of correcting trapezoidal distortion in an image to be projected, a method of correcting trapezoidal distortion in an image to be projected, and a recording medium storing a distortion correction program.

2. Background

The recent projector devices are provided with a keystone distortion correction function, which corrects trapezoidal distortion in an image to be projected. For example, the projector device detects an inclination angle of the projector device using an accelerometer, corrects trapezoidal distortion in the image based on the detected inclination angle, and projects the corrected image on a screen. The accelerometer does not only detect static acceleration due to gravity, but also detects dynamic acceleration due to vibration or shock. For this reasons, even when a table on which the projector device is provided vibrates even slightly, the projector device performs distortion correction. This may sometimes lower the quality of the projection image being displayed on the screen, as the projection image is constantly updated.

In view of this, Japanese Patent Application Publication No. JP 2005-79939-A obtains the output signal of an accelerometer for a plurality of times, and corrects trapezoidal distortion based on the value of output signal that occurs most frequently, thus reducing the number of times the projector device performs distortion correction.

SUMMARY

The projector device disclosed in Japanese Patent Application Publication No. JP 2005-79939-A corrects trapezoidal distortion based on the value of output signal that occurs most frequently, irrespective of the magnitude of vibration or shock that is detected. For example, the most frequently occurred output signal may be attributable to an output error of the accelerometer or a slight vibration of the table where the projector device is provided. This may still cause the projector device to repeat operation of correcting trapezoidal distortion more than it is needed, thus lowering quality of the projection image.

In view of the above, one aspect of the present invention is to provide a projector device, which determines whether to correct trapezoidal distortion in an image to be projected based on the magnitude of an output signal of the accelerometer to generate a determination result, and corrects trapezoidal distortion in the image only when the determination result indicates that distortion correction is to be performed.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 1:
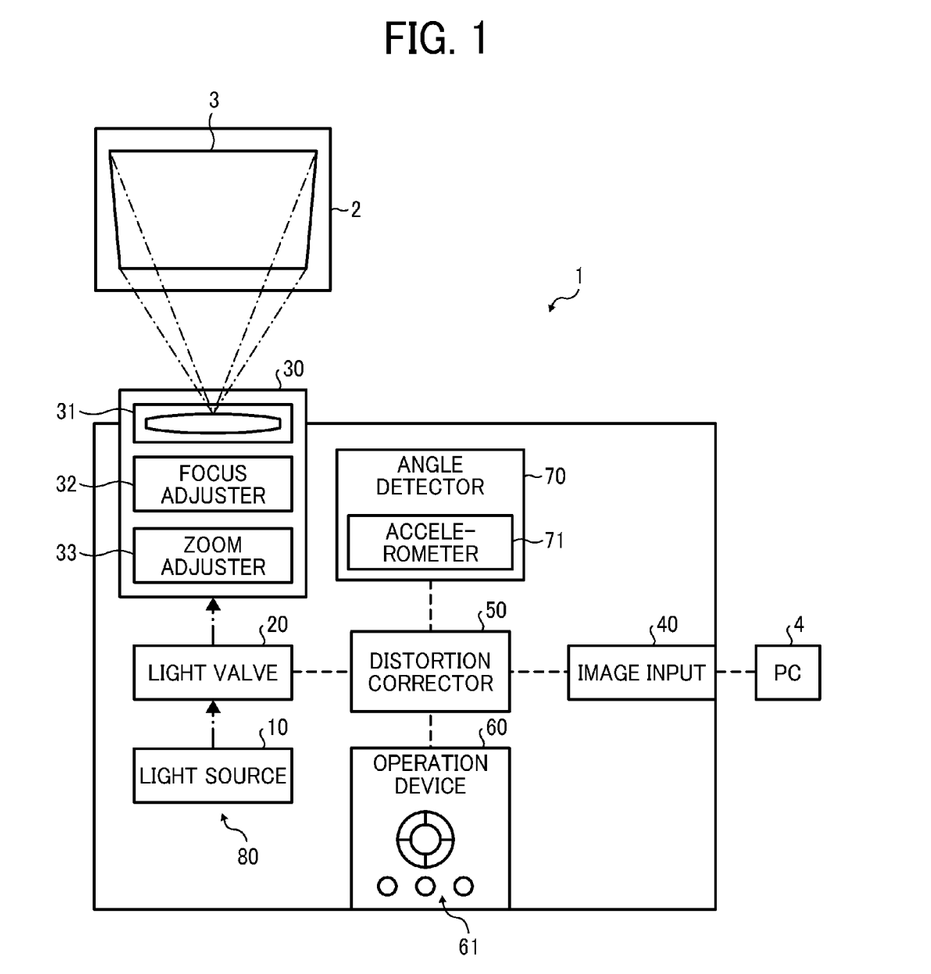
FIG. 1 is a schematic block diagram illustrating a structure of a projector device, according to an example embodiment of the present invention.

Referring to FIG. 1, a structure of a projector device 1 is explained according to an example embodiment of the present invention. The projector device 1 of FIG. 1 projects an image using the liquid crystal display (LCD) technology. Alternatively, the projector device 1 of FIG. 1 may use any desired projection technologies including digital light processing (DLP) technology using one or more digital micro mirror devices (DMDs).

The projector device 1 includes a projector 80, an image input 40, a distortion corrector 50, an operation device 60, and an angle detector 70.

The projector 80 includes a light source 10, a LCD light valve ("light valve") 20, and a projection optical system 30. The light source 10 is provided with a lamp, and a light polarizing element that converts light irradiated from the lamp to linear polarized light. The lamp may be implemented by, for example, a halogen lamp. The other examples of lamp include, but not limited to, metal halide lamp, high-pressure mercury lamp, laser, and light emitting diode (LED).

The light valve 20 is provided with an image forming section 21 (FIG. 2). The light valve 20 forms an image 22 on the image forming section 21, based on information output from the distortion corrector 50. Unless the image is corrected at the distortion corrector 50, the light valve 20 forms the image 22 on the image forming section 21 based on image data input by the image input 40.

The projection optical system 30 includes a lens system 31, a focus adjuster 32, and a zoom adjuster 33. The focus adjuster 32 adjusts the focus of a projection image 3 displayed on a screen 2. The zoom adjuster 33 enlarges or reduces the size of the projection image 3 displayed on the screen 2 by zooming in or out.

The light irradiated from the light source 10 is directed to the image 22 on the image forming section 21, as the light passes the image forming section 21 of the light valve 20. The projection optical system 30 projects the image 22, which is irradiated with the light, toward the outside to display the image 22 as the projection image 3 on the screen 2. The projector 80 projects the projection image 3 on the screen 2, which is substantially perpendicular with respect to the floor or the ceiling of a room where the projector device 1 is provided.

The image input 40 inputs the image data output from an image output device such as a personal computer (PC) 4. The other examples of the image output device include, but not limited to, a DVD player, video player, and television. Alternatively, the image input 40 may input image data, which is received through a network.

The distortion corrector 50 is implemented by processor. The processor includes a central processing unit (CPU), a read only memory (ROM) that stores various control programs, a random access memory (RAM) that temporarily stores data, a backup memory, an input port, and an output port.

In this example, the ROM stores a control program that causes the distortion corrector 50 to execute operation of correcting geometric distortion such as trapezoidal distortion in an image. The CPU deploys the distortion correction control program stored in the ROM onto the RAM functioning as a work memory area to perform various operations including adjusting a correction amount based on angle information input by the angle detector 70 or an instruction obtained through the operation device 60, and correcting distortion in the image input by the image input 40.

The distortion corrector 50 corrects trapezoidal distortion in the projection image 3 to be displayed or being displayed on the screen 2, based on an inclination angle "X" of the projector 80 that is detected by the accelerometer 71. The accelerometer 71 is capable of detecting the inclination angle of the projector 80 in the up or down directions with respect to a horizontal surface.

Figure 2A:
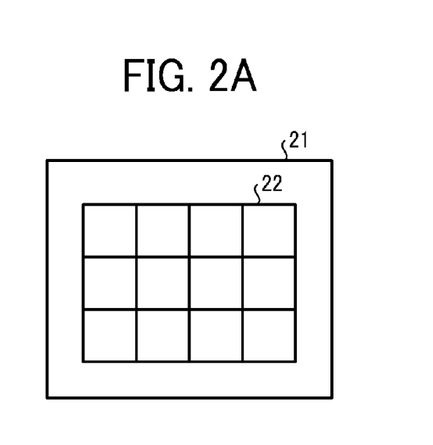
FIG. 2A is an illustration of an image formed on an image forming section of a light valve of the projector device of FIG. 1.
Figure 2B:
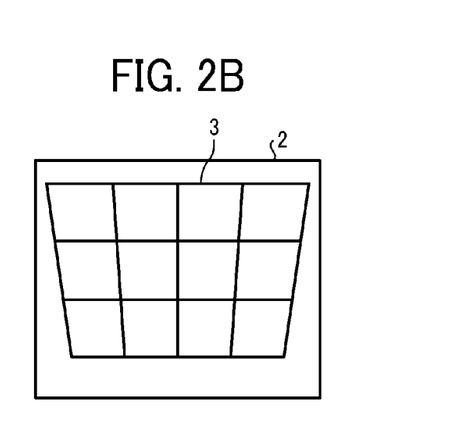
FIG. 2B is an illustration of a projection image displayed on a screen based on the image of FIG. 2A, which is distorted.
Figure 2C:
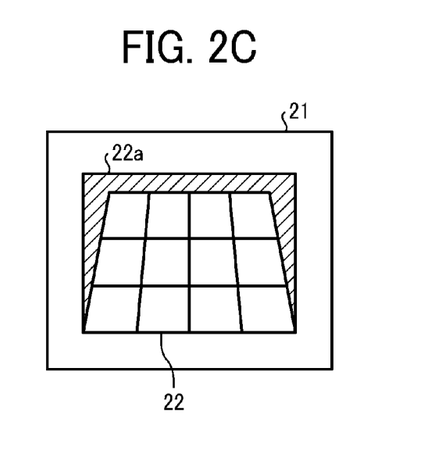
FIG. 2C is an illustration of a corrected image formed on the image forming section of the light valve of the projector device of FIG. 1.
Figure 2D:
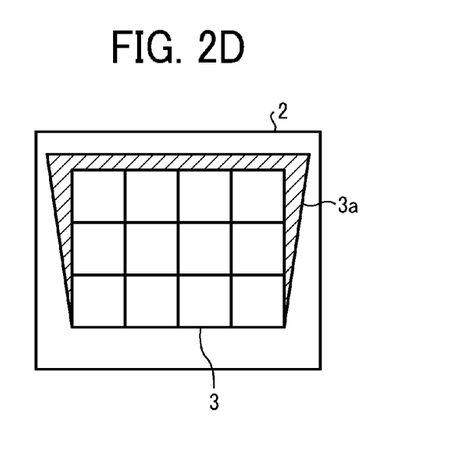
FIG. 2D is an illustration of a projection image displayed on the screen based on the corrected image of FIG. 2C.

As illustrated in FIG. 2A, it is assumed that the image 22 having a rectangular shape is formed on the image forming section 21 of the light valve 20. Unless the image 22 is corrected, the resultant projection image 3 would be distorted so as to have a trapezoidal shape as illustrated in FIG. 2B based on the inclination of the projector device 1. To correct distortion in the projection image 3, as illustrated in FIG. 2C, the distortion corrector 50 sets a border section 22a (hatched area) of the image 22 formed on the image forming section 21 of the light valve 20 to black colors, based on the inclination angle of the projector device 1. When the image 22 is projected onto the screen 2, as illustrated in FIG. 2D, the border section 22a of the image 22 is displayed as a border section 3a of the projection image 3, in black color. The rest of the projection image 3, from which the border section 22a is removed, is displayed in color based on the original image. Since the border section 3a is displayed in black, the user is most likely to think that the projection image 3 is in rectangular shape.

In this example, when the detected inclination angle X of the projector 80 has a value greater than the minimum angle value α, the distortion corrector 50 performs distortion correction. More specifically, when the detected inclination angle X of the projector device 1 is greater than the minimum angle value α, the distortion corrector 50 corrects distortion in the projection image 3. The minimum angle value α is previously determined depending on a projection distance L0 of the projector device 1.

Figure 5A:
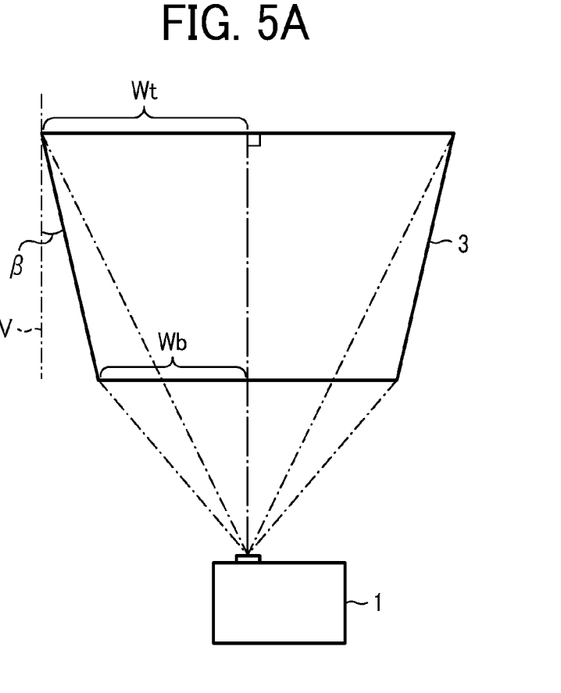
FIGS. 5A and 5B are an illustration for explaining the relationship between a minimum angle and a projection distance of the projector device of FIG. 1, using a projection image displayed on the screen.
Figure 5B:
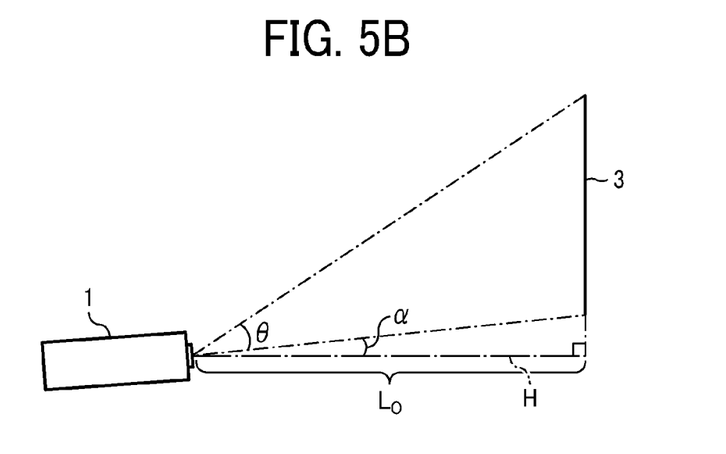

For example, as illustrated in FIG. 5B, the projector 80 is tilted at a slight angle even when the projector device 1 is provided at a horizontal surface. In order to detect inclination of the projector 80 with respect to a horizontal surface, the minimum angle value needs to be taken into account in addition to a projection angle θ of the projector 80.

As illustrated in FIGS. 5A and 5B, the distortion corrector 50 may calculate the minimum angle value α of the detected inclination angle X, which defines an inclination angle value subjected for distortion correction, using the following equation.

$$\tan \beta = (Wt-Wb)/(L0*(\tan(\theta+\alpha)-\tan \alpha))$$

In FIG. 5A, the line "V" indicates a vertical line, or substantially a vertical line. In FIG. 5B, the line "H" indicates a horizontal line, or substantially a horizontal line. In the equation, α denotes the minimum angle value of inclination angle X that defines an inclination angle value subjected for distortion correction (FIG. 5B). β denotes the distorted angle of the projection image 3, which reflects the degree of distortion in the projection image 3 (FIG. 5A). Wt denotes a half of the upper side length of the projection image 3 (FIG. 5A). Wb denotes a half of the lower side length of the projection image 3 (FIG. 5A). θ denotes a projection angle of the projector 80 in the projector device 1 (FIG. 5B). L0 denotes a projection distance of the projector device 1, which is obtained as a distance between the projector 80 and the projection image 3 (FIG. 5B).

For example, it is assumed that distortion correction in the projection image 3 needs to be performed, in case the ratio (Wt/Wb) between the upper side 2Wt and the lower side 2Wb is 1% or greater. In such case, the distorted angle β of the projection image 3 is about 0.5 degrees. In case the projection distance L0 is 400 mm, the minimum angle value α for β=0.5 degrees is about 0.3 degrees. In case the projection distance L0 is 1200 mm, the minimum value angle α for β=0.5 is about 0.7 degrees.

The distortion corrector 50 detects a plurality of inclination angle values X using the accelerometer 71 during sampling, selects one or more inclination angle values X that are less than a predetermined threshold, and calculates the average value of the selected inclination angles X to obtain a representative angle value Ax. For example, it is assumed that the accelerometer 71 detects the inclination angle X every 100 milliseconds for 2 seconds of sampling time. In such case, 20 samples of inclination angle X are obtained for one unit of sampling time (that is, 2 seconds). Assuming that the threshold is set to 10 degrees, the inclination angles X less than 10 degrees are averaged to obtain the representative angle Ax for one unit of sampling time. The inclination angle X that is less than the threshold may reflect slight vibrations of a table 5 or a detection error of the accelerometer 71.

The distortion corrector 50 may set a limit angle $A_L$ at the value that is two or three times of the minimum angle value $\alpha$. The limit angle value $A_L$ is compared with the difference in representative angles $(Ax-A_{x-1})$ between the current sampling time and the previous sampling time.

As illustrated in FIG. 1, the operation device 60 is provided with a power switch and various adjuster keys 61, which are respectively formed on the upper surface of the projector device 1. The adjuster keys 61 include, for example, a zoom key for zooming in or out the projection image 3, a correction key for instructing distortion correction of the projection image 3, and a focus key for focusing the projection image 3.

In alternative to or addition to automatically correcting distortion using the distortion corrector 50, the projector device 1 may correct distortion in the image according to a user instruction. For example, after distortion in the projection image 3 is automatically corrected by the distortion corrector 50, the user may manually adjust the projection image 3 through the operation device 60 provided on the surface of the projector device 1. The operation device 60 may be remotely controlled using a remote controller.

The angle detector 70 is provided with the accelerometer 71. The accelerometer 71 detects an inclination angle of the projector device 1, which indicates the degree of tilt of the projector 80 with respect to the horizontal surface. The angle detector 70 obtains inclination angle information regarding the inclination angle detected by the accelerometer 71, and outputs the inclination angle information to the distortion corrector 50. In this example, the accelerometer 71 has a resolution capability, which is set at an angle smaller than the minimum angle value $\alpha$, such as at 0.1 degrees.

Further, in this example, the accelerometer 71 is implemented by an analog single-axis accelerometer, which outputs a voltage that is proportional to acceleration. Alternatively, the accelerometer 71 may be provided with any desired number of detection axis such as two or three axes, or may output the detection result in any other form such as in digital form based on the duty cycle.

Figure 3A:
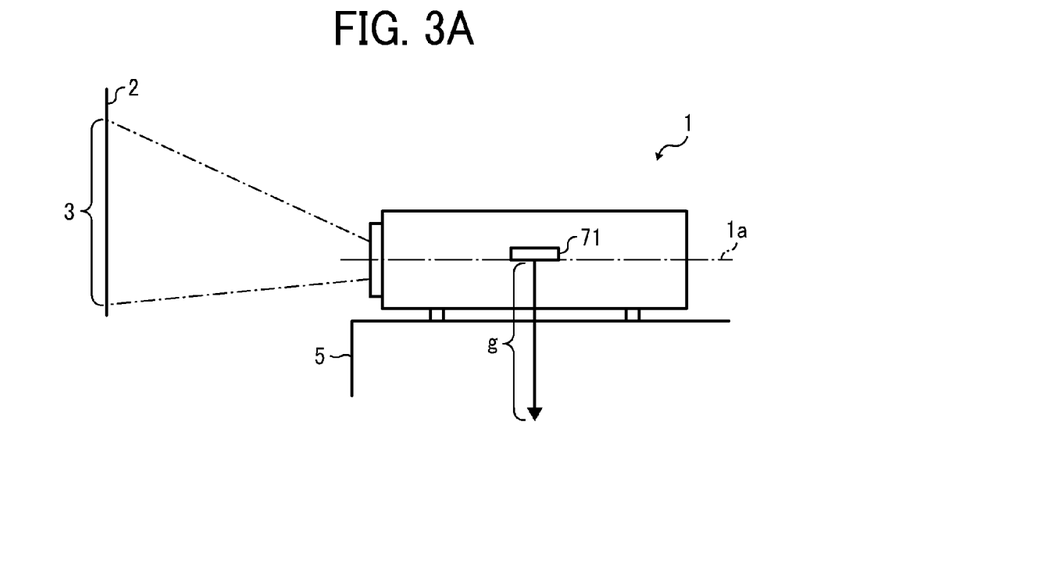
FIG. 3A is an illustration for explaining operation of detecting an inclination angle of the projector device of FIG. 1, when the projector device of FIG. 1 is provided in substantially perpendicular with respect to a horizontal surface.
Figure 3B:
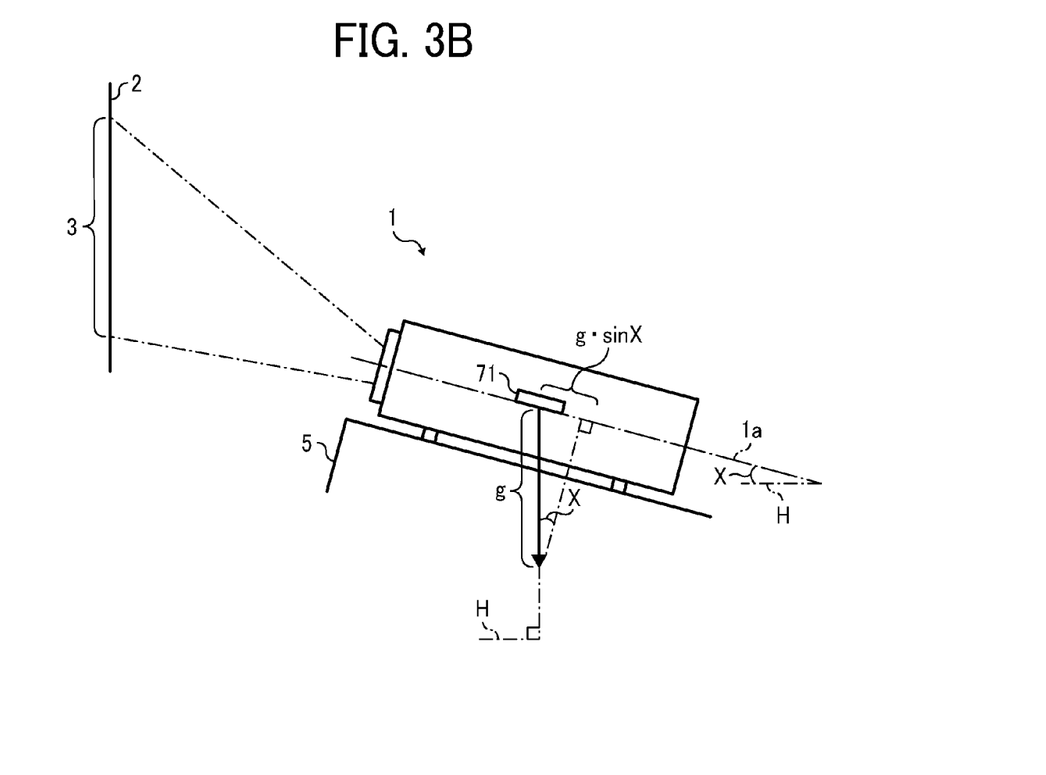
FIG. 3B is an illustration for explaining operation of detecting an inclination angle of the projector device of FIG. 1, when the projector device of FIG. 1 is inclined with respect to the horizontal surface.

As illustrated in FIGS. 3A and 3B, the accelerometer 71 is incorporated in the inner body of the projector device 1. The accelerometer 71 detects acceleration that acts along the axis 1a of the projector device 1. The axis 1a runs horizontally through the body of the projector device 1.

More specifically, referring to FIG. 3A, when the upper surface of the table 5 at which the projector device 1 is provided is horizontal, gravitational acceleration "g" acts on the accelerometer 71 in a direction that is downward along the substantially vertical direction. Since there is no acceleration that acts along the axis 1a, the accelerometer 71 outputs the "0" value as the inclination angle information.

Referring to FIG. 3B, when the upper surface of the table 5 at which the projector device 1 is provided is tilted with respect to the horizontal line H, the projector device 1 projects the projection image 3 while facing upward. Assuming that the inclination angle of the projector device 1 is X degrees with respect to the horizontal line H, an acceleration component that acts on the back portion of the projector device 1 is g*sin X. The accelerometer 71 outputs a voltage that is proportional to the acceleration component. The angle detector 70 detects an inclination angle of the projector device 1, based on the voltage output from the accelerometer 71.

The distortion corrector 50 corrects trapezoidal distortion in an image to be projected, using the inclination angle of the projector device 1 that is detected at the angle detector 70. More specifically, in this example, the distortion corrector 50 corrects distortion in the image to be projected, when it is determined that the inclination angle detected by the accelerometer 71 indicates the change that is sufficiently large.

For example, the distortion corrector 50 sets a sampling time period at a predetermined value. The distortion corrector 50 sets the value of a limit angle $A_L$ at a value greater than the minimum angle value $\alpha$ that defines an inclination angle value subjected for distortion correction by the distortion corrector 50. The distortion corrector 50 calculates a representative angle value Ax, based on a plurality of inclination angle values X that are detected by the accelerometer 71 during one unit of the sampling time period.

The distortion corrector 50 further calculates the difference in representative angle value $(Ax-A_{x-1})$, between the representative angle value Ax for the current sampling time and the representative angle value $A_{x-1}$ for the previous sampling time. The distortion corrector 50 determines whether the difference in representative angle $(Ax-A_{x-1})$ is equal to or greater than the limit angle value $A_L$. When it is determined that the difference in representative angle $(Ax-A_{x-1})$ is equal to or greater than the limit angle value $A_L$, the distortion corrector 50 corrects trapezoidal distortion in the image to be projected.

Figure 4:
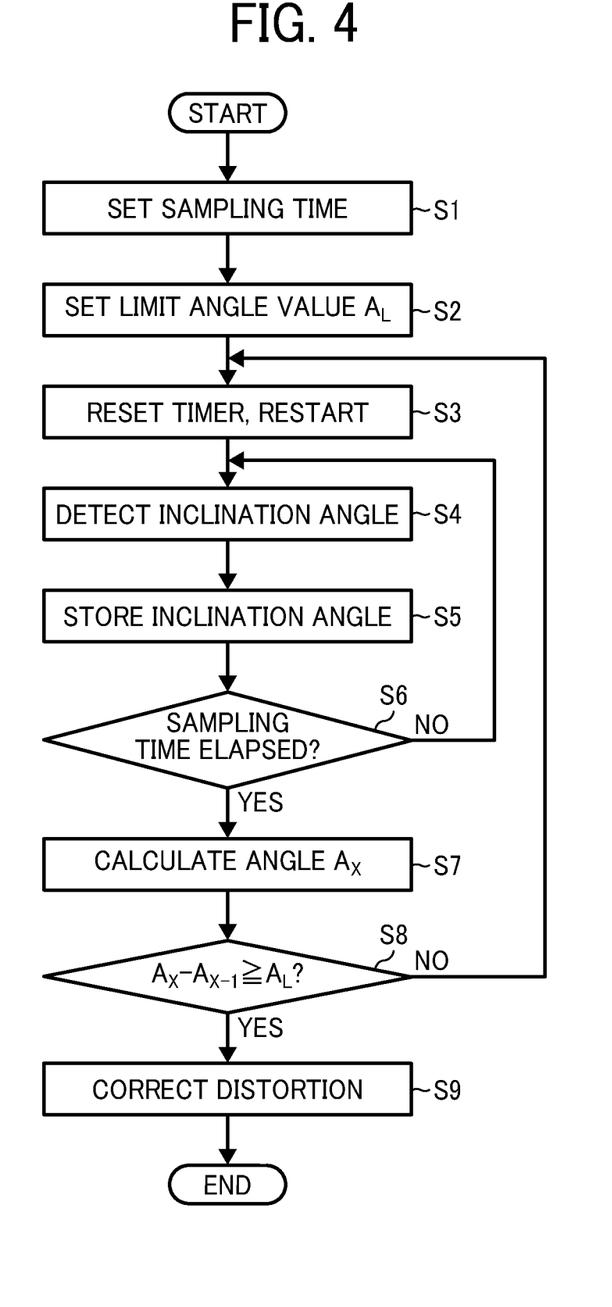
FIG. 4 is a flowchart illustrating operation of correcting trapezoidal distortion in an image, performed by the projector device of FIG. 1, according to an example embodiment of the present invention.

Referring now to FIG. 4, operation of correcting trapezoidal distortion in the image to be projected, performed by the projector device 1, is explained according to an example embodiment of the present invention.

At S1, the distortion corrector 50 sets a predetermined value of sampling time period. In this example, the sampling time is set to 2 seconds.

At S2, the distortion corrector 50 sets the value of a limit angle $A_L$ at a value greater than the minimum angle value $\alpha$ that defines an inclination angle value subjected for distortion correction by the distortion corrector 50. As described above, the minimum angle value $\alpha$ that defines an inclination angle value subjected for distortion correction by the distortion corrector 50 is obtained using the equation: $\tan \beta = (Wt-Wb)/(L0*(\tan(\theta+\alpha)-\tan \alpha))$. In this example, the distortion corrector 50 sets the value of the limit angle $A_L$ to the value that is twice of the minimum angle value $\alpha$.

At S3, the distortion corrector 50 resets a timer value for counting the sampling time period to restart counting the sampling time period. For example, the processor that functions as the distortion corrector 50 is provided with a timer that counts a time period to output a timer value.

At S4, the distortion corrector 50 detects the value of the inclination angle X of the projector device 1, using the accelerometer 71.

At S5, the distortion corrector 50 stores the detected value of the inclination angle X in a memory such as in the RAM of the processor that functions as the distortion corrector 50.

At S6, the distortion corrector 50 refers to the timer value of the timer that counts the sampling time period, and determines whether the counted timer value reaches the predetermined sampling time period that is set at S2.

When it is determined that the counted timer value does not reach the predetermined sampling time period ("NO" at S6), the operation repeats S4 to detect the value of the inclination angle X of the projector device 1 using the accelerometer 71.

When it is determined that the counted timer value reaches the predetermined sampling time period ("YES" at S6), the operation proceeds to S7. At S7, the distortion corrector 50 calculates a representative angle value Ax of the current sampling time period, from a plurality of inclination angle values X that is detected using the accelerometer 71 during the current sampling time period.

In this example, the distortion corrector 50 sets the sampling time period to 2 seconds, and detects an inclination angle X every 100 milliseconds, such that total of 20 inclination angles X are obtained during one unit of sampling time period. The distortion corrector 50 further calculates the average value of the inclination angles X that are less than 10 degrees to obtain the representative angle value Ax. The calculated representative angle value Ax is stored in the memory, such as in the RAM of the processor that functions as the distortion corrector 50.

At S8, the distortion corrector 50 calculates the difference $(Ax-A_{x-1})$ between the representative angle Ax obtained for the current sampling time period and the representative angle A obtained for the previous sampling time period. The representative angle A for the previous sampling time period is obtained from the memory in the RAM of the processor that functions as the distortion corrector 50. At S8, the distortion corrector 50 determines whether the calculated representative angle difference $(Ax-A_{x-1})$ is equal to or greater than the limit angle value $A_L$.

When it is determined that the calculated representative angle difference value $(Ax-A_{x-1})$ is not equal to or greater than the limit angle value $A_L$ ("NO" at S8), the operation returns to S3 to reset the timer value to restart counting the sampling time period. In such case, the distortion corrector 50 does not perform distortion correction.

When it is determined that the calculated representative angle difference value $(Ax-A_{x-1})$ is equal to or greater than the limit angle value $A_L$ ("YES" at S8), the operation proceeds to S9. At S9, the distortion corrector 50 corrects trapezoidal distortion in the image based on the representative angle value Ax obtained for the current sampling time period. For example, the distortion corrector 50 corrects the image 22 formed on the image forming section 21 of the light valve 20 using any desired known technique.

As described above, the distortion corrector 50 corrects trapezoidal distortion in the image to be projected, only when the representative angle difference value $(Ax-A_{x-1})$ is equal to or greater than the limit angle value $A_L$. That is, even when a small vibration continuously occurs, the distortion corrector 50 does not perform trapezoidal distortion such that degradation in image quality of the projection image 3 being displayed on the screen 2 is suppressed.

Further, the representative angle value Ax for one unit of sampling time period is obtained as the average value of the inclination angle values X that are less than 10 degrees. Accordingly, the representative angle value Ax reflects small values of inclination, which may be attributable to a detection error in the accelerometer 71 or a small vibration of the table 5. As the inclination angles X having larger values are eliminated, a parameter to be used for distortion correction that is determined based on the representative angle value Ax are more suitable for correcting smaller values of inclination.

Further, the minimum angle value α is obtained using the equation: $\tan \beta = (Wt-Wb)/(L0*(\tan(\theta+\alpha)-\tan \alpha))$, such that the minimum angle value α is set based on the projection distance L0. This further suppresses degradation in image quality of the projection image 3, irrespective of the value of projection distance L0. In case of a very short-focal length projector having the projection distance L0 of 0 to 800 mm, or a short-focal length projector having the projection distance L0 of 800 to 1200 mm, the projection angle θ is greatly influenced by the value of projection distance L0. Accordingly, especially when the very short-focal length projector or the short-focal length projector is used, controlling distortion correction using the minimum angle value α as described above can further improve the image quality of the projection image 3.

Further, in this example, the limit angle value $A_L$ is set at the value twice of the minimum angle value α. When the inclination angle X of the projector device 1 is sufficiently large such that it is equal to or greater than twice of the minimum angle value α, the distortion corrector 50 corrects trapezoidal distortion in the image. Accordingly, the projector device 1 improves the image quality of the projection image 3 as trapezoidal distortion is corrected when vibration that is sufficiently large occurs.

In this example, the representative angle value Ax is obtained as the average value of the inclination angle values X that are less than 10 degrees. Alternatively, a threshold value may not be limited to the value of 10 degrees, as long as it is greater than the value of angle that may be detected due to a small vibration or a small detection error. The threshold value may be preferably set at 5 to 15 degrees, and more preferably set to 10 degrees.

Further, in this example, the representative angle value Ax is obtained by calculating the average value of the inclination angle values X, which are detected during the sampling time period and less than the predetermined threshold. However, the representative angle value Ax may be obtained in various other ways. For example, any desired sampling time period or detection frequency may be used. Any desired value may be set as a sampling time period as long as it is greater than 0. The sampling time period may be preferably set at 1 to 3 seconds, and more preferably set at 2 seconds. The detection frequency of the inclination angle X may be preferably set at 50 to 200 milliseconds, and more preferably set at 100 milliseconds.

Further, in this example, the limit angle value $A_L$ is set at the value twice of the minimum angle value α. Alternatively, any other desired value that is greater than the minimum angle value α may be set as the limit angle value $A_L$. The limit angle value $A_L$ may be preferably set at two to three times of the minimum angle value α, and more preferably set at twice of the minimum angle value α.

Further, in this example, the LCD light valve 20 is used to project an image. Alternatively, the projector device 1 may use any other desired projection technology such as the DLP technology using the DMDs. When the DLP is used, the white light that is irradiated from a lamp is collected at a lens system to be directed to the DMDs. The light that passes through the respective minors of the DMDs having the on-state is enlarged at a lens system and projected onto the screen.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a projector device including: a projector that projects an image onto a screen that is substantially vertical; an accelerometer that detects inclination of the projector in the upward or downward direction with respect to a horizontal surface; and a distortion corrector that corrects trapezoidal distortion in the image to be projected onto the screen based on an inclination angle of the projector that is detected by the accelerometer. The distortion corrector previously sets a sampling time period at a predetermined value, and a limit angle at a value greater than a minimum angle value that defines an inclination angle value subjected for distortion correction by the distortion corrector. The distortion corrector calculates a representative angle value for a current sampling time period based on a plurality of inclination angles detected by the accelerometer during the current sampling time period, and further calculates the difference in representative angle value between the current sampling time period and a previous sampling time period. When the representative angle difference is equal to or greater than the limit angle, the distortion corrector corrects trapezoidal distortion in the image to be projected.

With the above-described structure, even when a small vibration continuously occurs, the distortion corrector does not automatically perform distortion correction. This reduces a number of times the trapezoidal distortion correction is performed, thus suppressing image quality of the projection image.

For example, when a slight vibration occurs, which may be attributable to a slight vibration on a table or a detection error in accelerometer, the inclination angle detected by the accelerometer would have a small value such that it will be reflected to the representative angle obtained for a current sampling time period. When the difference between the representative angle value obtained for the current sampling time period and a representative angle value obtained for the previous sampling time period does not exceed the limit angle value, the distortion corrector does not perform distortion correction. For example, even when the representative angle value obtained for the previous sampling time is 0, the distortion corrector does not perform distortion correction unless the difference is sufficiently large. Accordingly, the distortion corrector does not perform distortion correction due to small vibrations or detection errors. This suppresses degradation in image quality of the projection image that may be otherwise caused by repeating distortion correction more than it is needed.

What is claimed is:

1. A projector device comprising:
a projector configured to project an image onto a projection surface;
an accelerometer configured to detect inclination of the projector with respect to a horizontal surface to output an inclination angle value of the projector; and a processor configured to:
set a sampling time period during which the accelerometer outputs the inclination angle value of the projector at a value;
set a value of limit angle value to be greater than a minimum angle value, the minimum angle value defining a minimum inclination angle value of the projector at which the projector is subject to distortion correction by the processor;
calculate a representative angle value of a current sampling time period based on a plurality of inclination angle values of the projector that are detected by the accelerometer for the current sampling time period, the current sampling time period having the value;
calculate a difference between the representative angle value obtained for the current sampling time period and a representative angle value obtained for a previous sampling time period, the previous sampling time period being a sampling time period that immediately precedes the current sampling time period;
determine whether the difference in the representative angle values is equal to or greater than the limit angle value to generate a determination result; and
correct trapezoidal distortion in the image to be projected based on the representative angle value of the current sampling time period when the determination result indicates that the difference in the representative angle values is equal to or greater than the limit angle value.

2. The projector device of claim 1, wherein the processor is configured to select one or more of the plurality of inclination angle values detected by the accelerometer during the current sampling time period, each of the plurality of inclination values having a value less than a threshold value, and to calculate an average value of the selected inclination angle values to obtain the representative angle value for the current sampling time period.

3. The projector device of claim 1, wherein the minimum angle value is calculated using an equation: $\tan \beta = (Wt-Wb)/(L0*(\tan(\theta+\alpha)-\tan \alpha))$, wherein
$\alpha$ denotes the minimum angle value;
$\beta$ denotes a distorted angle of the projection image;
Wt denotes a half of an upper side length of the projection image;
Wb denotes a half of a lower side length of the projection image;
$\theta$ denotes a projection angle of the projector; and
L0 denotes a projection distance of the projector device.

4. The projector device of claim 1, wherein the limit angle value is set at a value that is two or three times greater than the minimum angle value.

5. The projector device of claim 1, wherein the value of the sampling time period is set at a value between one and three seconds.

6. The projector device of claim 2, wherein the threshold value used for selecting one or more of the plurality of inclination angle values is set at a value between 5 to 15 degrees.

7. A method of correcting trapezoidal distortion in an image to be projected by a projector device, the method comprising:
setting a sampling time period at a value;

setting a limit angle value to be greater than a minimum angle value, the minimum angle value defining a minimum inclination angle of the projector at which the projector is subject to distortion correction;

detecting inclination of the projector device with respect to a horizontal surface to output a plurality of inclination angle values of the projector device during a current sampling time period having the value;

calculating a representative angle value of the current sampling time period based on the plurality of inclination angle values of the projector device that are detected for the current sampling time period;

calculating a difference between the representative angle value obtained for the current sampling time period and a representative angle value obtained for a previous sampling time period the previous sampling time period being a sampling time period that immediately precedes the current sampling time period;

determining whether the difference in the representative angle values is equal to or greater than the limit angle value to generate a determination result; and correcting the trapezoidal distortion in the image to be projected based on the representative angle value of the current sampling time period when the determination result indicates that the difference in the representative angle values is equal to or greater than the limit angle value.

8. The method of claim 7, wherein the step of calculating a representative angle value includes:

selecting one or more of the plurality of inclination angle values detected during the current sampling time period and each having a value less than a predetermined threshold value; and calculating an average value of the selected inclination angle values to obtain the representative angle value for the current sampling time period.

9. The projector device of claim 7, wherein the minimum angle value is calculating using an equation: $\tan \beta = (Wt-Wb)/(L0*(\tan(\theta+\alpha)-\tan \alpha))$, wherein $\alpha$ denotes the minimum angle value;

$\beta$ denotes a distorted angle of the projection image;

Wt denotes a half of an upper side length of the projection image;

Wb denotes a half of a lower side length of the projection image;

$\theta$ denotes a projection angle of the projector; and

L0 denotes a projection distance of the projector device.

10. The method of claim 7, wherein the limit angle value is set at a value that is two or three times greater than the minimum angle value.

11. A non-transitory recording medium storing a plurality of instructions which, when executed by a processor, cause the processor to perform a method of correcting trapezoidal distortion in an image to be projected by a projector device, the method comprising:

setting a sampling time period at a value;

setting a limit angle value to be greater than a minimum angle value, the minimum angle value defining a minimum inclination angle value of the projector at which the projector is subject to distortion correction;

detecting inclination of the projector device with respect to a horizontal surface to output a plurality of inclination angle values of the projector device during a current sampling time period having the value;

calculating a representative angle value of the current sampling time period based on the plurality of inclination angle values of the projector that are detected for the current sampling time period;

calculating a difference between the representative angle value obtained for the current sampling time period and a representative angle value obtained for a previous sampling time period the previous sampling time period being a sampling time period that immediately precedes the current sampling time period;

determining whether the difference in the representative angle values is equal to or greater than the limit angle value to generate a determination result; and correcting the trapezoidal distortion in the image to be projected based on the representative angle value of the current sampling time period when the determination result indicates that the difference in the representative angle values is equal to or greater than the limit angle value.

* * * * *